United States Patent
Kamitani

(10) Patent No.: US 7,609,600 B2
(45) Date of Patent: Oct. 27, 2009

(54) OPTICAL DISC RECORDING/REPRODUCING APPARATUS CAPABLE OF RECORDING DATA EARLY

(75) Inventor: Tsuyoshi Kamitani, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 681 days.

(21) Appl. No.: 11/265,443

(22) Filed: Nov. 2, 2005

(65) Prior Publication Data

US 2006/0092805 A1    May 4, 2006

(30) Foreign Application Priority Data

Nov. 2, 2004    (JP)    ............... 2004-319330

(51) Int. Cl.
*G11B 20/10*    (2006.01)
(52) U.S. Cl. .............. 369/53.24; 369/59.22; 369/47.22; 369/53.37; 369/13.25; 369/13.26
(58) Field of Classification Search .............. 369/53.37, 369/53.24, 47.22, 59.22, 13.25, 13.26
See application file for complete search history.

(56) References Cited

U.S. PATENT DOCUMENTS

| | | | | |
|---|---|---|---|---|
| 5,774,434 A | * | 6/1998 | Arataki et al. ........... | 369/47.13 |
| 5,953,309 A | * | 9/1999 | Yoshimoto et al. ....... | 369/275.3 |
| 6,310,854 B1 | * | 10/2001 | Sato et al. ............... | 369/275.3 |
| 6,496,462 B2 | * | 12/2002 | Kuribayashi et al. ..... | 369/59.11 |
| 7,233,736 B2 | * | 6/2007 | Aridome et al. .......... | 386/131 |
| 2002/0114239 A1 | * | 8/2002 | Yokokawa ............... | 369/53.22 |
| 2005/0083812 A1 | * | 4/2005 | Miyamoto et al. ........ | 369/53.2 |
| 2005/0152235 A1 | * | 7/2005 | Hoshizawa .............. | 369/30.16 |

FOREIGN PATENT DOCUMENTS

JP    2003-331526    11/2003

OTHER PUBLICATIONS

Patent Abstracts of Japan; Publication No. 2003-331526 dated Nov. 21, 2003 (1 page).

* cited by examiner

*Primary Examiner*—Wayne R Young
*Assistant Examiner*—Linh T Nguyen
(74) *Attorney, Agent, or Firm*—Osha • Liang LLP

(57) ABSTRACT

Recording is started in an INC mode at the time of start of initial data recording (step S1). Next, it is determined whether recording onto an unrecorded region is possible in the INC mode (step S2). If it is determined that the recording is impossible, next, temp lead-out is recorded at a last portion of a recording region (step S4). Then, a recording mode for format 2 RMD is changed (step S5). Next, format 3 RMD is newly created, and is recorded in RMD in a management region (step S6). Then, the recording is restarted in a ROW mode (step S7).

4 Claims, 7 Drawing Sheets

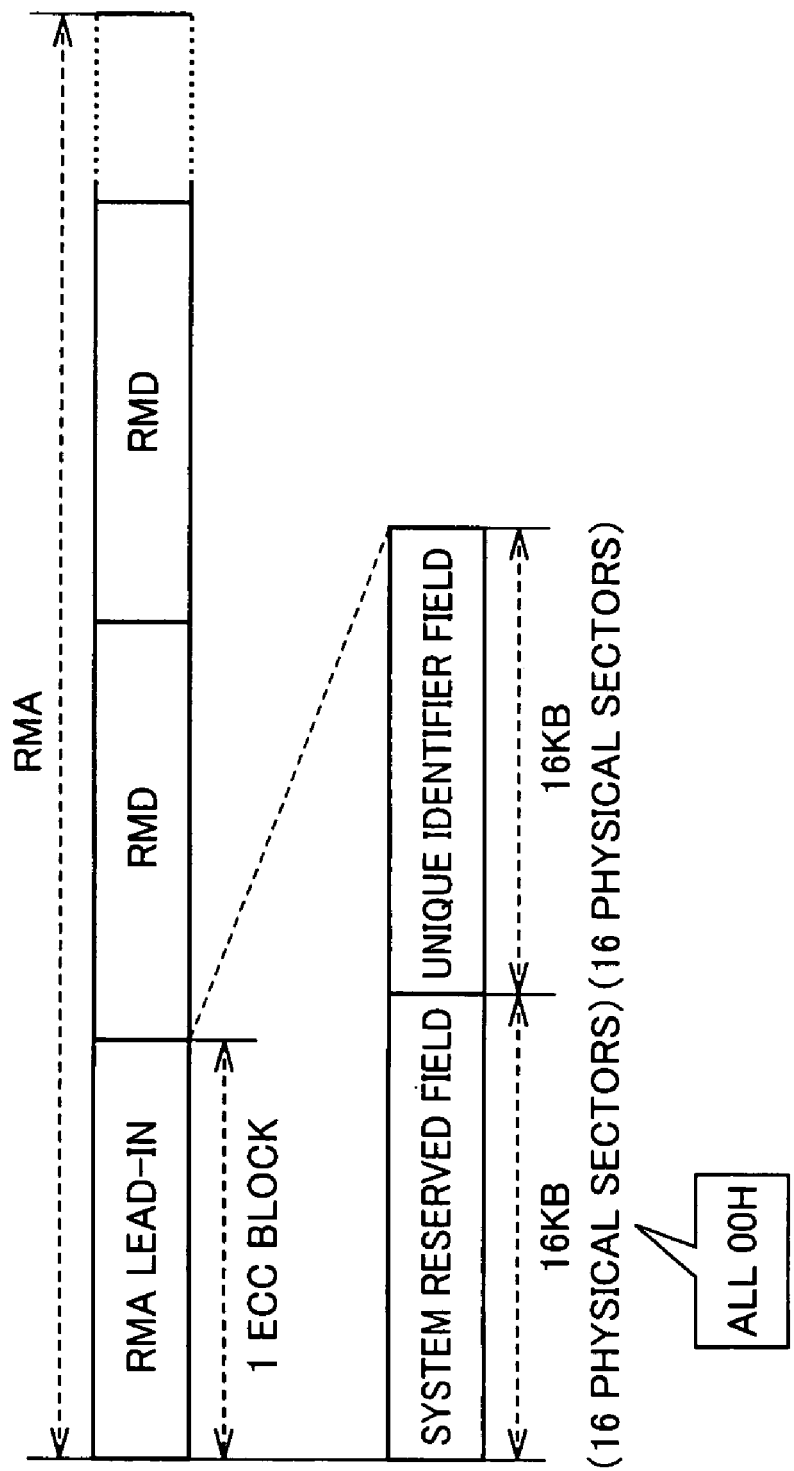

FIG.4

LIST OF FIELDS RECORDED IN RMA LEAD-IN

| FIELD | | SIZE | SET VALUE | DESCRIPTION |
|---|---|---|---|---|
| SYSTEM RESERVED FIELD | | 16KB | ALL 00H | UNUSED |
| UNIQUE IDENTIFIER FIELD | DISC MANUFACTURER ID | 32BYTE | BINARY | DRIVE MANUFACTURER ID |
| | SERIAL NUMBER | 16BYTE | ASCII | DRIVE SERIAL NUMBER |
| | MODEL NUMBER | 16BYTE | ASCII | DRIVE MODEL NUMBER |
| | UNIQUE DISC ID | 16BYTE | | DISC ID |

FIG.5

TYPES OF RMD FORMAT

| NAME | DESCRIPTION | RECORDING MODE |
|---|---|---|
| FORMAT 1 RMD | REGISTER INFORMATION REGARDING INC MODE AND DAO MODE | DAO, INC |
| FORMAT 2 RMD | REGISTER INFORMATION REGARDING RECORDING MODE AND ERASE OPERATION | ALL |
| FORMAT 3 RMD | REGISTER INFORMATION REGARDING ROW MODE | ROW |

FIG.6A

TYPE OF RMD

| CLASSIFICATION | CONTENT |
|---|---|
| FIXED VALUE | FIXED VALUE |
| STATUS | INFORMATION REPRESENTING RECORDING STATE OF DISC |
| DRIVE INFORMATION | INFORMATION OF RECORDING DRIVE |
| NUMERIC VALUE | ADDRESS, RZONE/BORDER NUMBER, ETC. |
| DEFECT | DEFECT INFORMATION |
| COUNTER | COUNTER |

FIG.6B

DATA TYPE OF FORMAT 1 RMD

| | FIELD NAME | CLASSIFICATION | |
|---|---|---|---|
| FIELD 0 | RMD FORMAT | FIXED VALUE | TYPE OF FORMAT OF THIS RMD |
| | DISC STATUS | STATUS | RECORDING STATUS OF DISC |
| | UNIQUE DISC ID | DRIVE INFORMATION | SAME CONTENTS AS UNIQUE ID OF RMA LEAD-IN |
| | COPY OF PRE-PIT INFORMATION | FIXED VALUE | COPY OF PRE-PIT INFORMATION |
| | RBG INFORMATION | COUNTER | CONTINUOUS COUNTER IN CASE OF RMD SET |
| FIELD 1 | LOGICAL UNIT & OPC INFORMATION #1-4 | DRIVE INFORMATION | INFORMATION OF RECORDED DRIVE |
| FIELD 2 | USER SPECIFIC DATA | DRIVE INFORMATION | USER SPECIFIC DATA |
| FIELD 3 | START SECTOR NUMBER OF BORDER-OUT #1-512 | NUMERIC VALUE | BORDER-OUT START ADDRESS |
| FIELD 4 | INVISIBLE RZONE | NUMERIC VALUE | INVISIBLE RZONE NUMBER |
| | FIRST OPEN RZONE NUMBER | NUMERIC VALUE | FIRST OPEN RZONE NUMBER |
| ⋮ | SECOND OPEN RZONE NUMBER | NUMERIC VALUE | SECOND OPEN RZONE NUMBER |
| FIELD 12 | START SECTOR NUMBER OF RZONE #1-2302 | NUMERIC VALUE | RZONE START ADDRESS |
| | LAST RECORDED ADDRESS OF RZONE #1-2302 | NUMERIC VALUE | RZONE LAST RECORDED ADDRESS |

FIG.6C

DATA TYPE OF FORMAT 2 RMD

| | FIELD NAME | CLASSIFICATION | |
|---|---|---|---|
| FIELD 0 | RMD FORMAT | STATUS | TYPE OF FORMAT OF THIS RMD |
| | DISC STATUS | STATUS | RECORDING STATUS OF DISC |
| | UNIQUE DISC ID | DRIVE INFORMATION | SAME CONTENTS AS UNIQUE ID OF RMA LEAD-IN |
| | COPY OF PRE-PIT INFORMATION | FIXED VALUE | COPY OF PRE-PIT INFORMATION |
| | RBG INFORMATION | COUNTER | CONTINUOUS COUNTER IN CASE OF RMD SET |
| FIELD 1 | UPDATE COUNTER | COUNTER | RMD SET UPDATE COUNTER |
| | FORMAT 3 RMD SET POINTER | NUMERIC VALUE | LATEST RMD SET START ADDRESS |
| | ERASE OPERATION COUNTER | COUNTER | NUMBER OF BLANK OPERATION EXECUTION |
| | RBDS | DEFECT | RMA SEGMENT DEFECT STATUS |
| FIELD 2 | ERASE OPERATION CODE | STATUS | BLANK OPERATION STATUS |
| | ERASE INFORMATION 1&2 | NUMERIC VALUE | START/END ADDRESS OF BLANK OPERATION |

FIG.6D

DATA TYPE OF FORMAT 3 RMD

| | FIELD NAME | CLASSIFICATION | |
|---|---|---|---|
| FIELD 0 | RMD FORMAT | STATUS | TYPE OF FORMAT OF THIS RMD |
| | DISC STATUS | STATUS | RECORDING STATUS OF DISC |
| | UNIQUE DISC ID | DRIVE INFORMATION | SAME CONTENTS AS UNIQUE ID OF RMA LEAD-IN |
| | COPY OF PRE-PIT INFORMATION | FIXED VALUE | COPY OF PRE-PIT INFORMATION |
| | RBG INFORMATION | COUNTER | CONTINUOUS COUNTER IN CASE OF RMD SET |
| FIELD 1 | LOGICAL UNIT & OPC INFORMATION #1-4 | DRIVE INFORMATION | INFORMATION OF RECORDED DRIVE |
| FIELD 2 | USER SPECIFIC DATA | DRIVE INFORMATION | USER SPECIFIC DATA |
| FIELD 3 | FORMAT OPERATION CODE | STATUS | FORMAT OPERATION CONTENT |
| | FORMAT INFORMATION 1&2 | NUMERIC VALUE | START/END ADDRESS OF FORMAT OPERATION |
| | START PSN OF THE BORDER-IN/OUT #1-16 | NUMERIC VALUE | BORDER-IN/OUT START ADDRESS |
| | BORDERED AREA STATUS #1-16 | STATUS | RECORD & DEFECT STATUS OF BORDERED AREA |
| | LAST RZONE NUMBER | NUMERIC VALUE | LAST RZONE NUMBER |
| | START/END SECTOR NUMBER OF RZONE #1-16 | NUMERIC VALUE | RZONE START/END ADDRESS |
| FIELD 4 | PSN OF PREVIOUS DEFECT STATUS BITMAP RMD SET | NUMERIC VALUE | RMD SET START ADDRESS OF PREVIOUS DEFECT STATUS BITMAP |
| ⋮ | CERTIFICATION START/END PSN | NUMERIC VALUE | START ADDRESS OF DEFECT STATUS BITMAP TO BE RECORDED NEXT |
| FIELD 12 | DEFECT STATUS BITMAP | DEFECT | REPRESENTING DEFECT INFORMATION OF ECC BLOCK |

OPTICAL DISC RECORDING/REPRODUCING APPARATUS CAPABLE OF RECORDING DATA EARLY

BACKGROUND OF THE INVENTION

1. Field of the Invention

The present invention relates to an optical disc recording/reproducing apparatus for recording information onto a rewritable optical disc such as a DVD-RW (DVD-Rewritable).

2. Description of the Background Art

Conventionally, in DVDs (Digital Versatile Discs) as a large capacity optical disc, there have been provided, as an information writable optical disc, a DVD-R (DVD-Recordable) in which data can be written only once, a DVD-RW (DVD-Rewritable) in which data can be additionally written, a DVD-RAM (DVD-Random Access Memory), and the like.

Herein, in the case where information such as a movie (generally also referred to as contents) is recorded on an optical disc having a high recording capacity, recording modes therefor are broadly divided into the following two modes.

One mode is a sequential recording mode for sequentially recording data. With this sequential recording mode, it is possible to sequentially record data from an inner circumferential side to an outer peripheral side of an optical disc.

The other mode is a restricted over write mode (hereinafter, simply referred to as "ROW mode") which is randomly accessible. With this restricted over write mode, it is possible to randomly record data at a recording region of an optical disc.

The sequential recording mode is further divided into two modes: a disc at once mode (hereinafter, simply referred to as "DAO mode"), and an incremental recording mode (hereinafter, simply referred to as "INC mode").

Both the DAO mode and INC mode are the sequential recording mode, that can perform data recording without performing a so-called finalizing process (a process for recording initial value data, e.g., setting all data on a disc to null (zero)) because data is sequentially recorded from an inner circumferential side to an outer peripheral side of a disc as described above. Accordingly, the DAO mode and the INC mode have an advantage that recording can be immediately performed without provision of a preparation time for recording.

These recording modes are controlled by a program such as writing software of a recording/reproducing apparatus. Any one of these recording modes is selected by a user or an administrator and is recorded in an optical disc. The selected recording mode is recorded in a management region for recording management information on an inner circumferential side of the optical disc.

In general, a management region of an optical disc is determined in accordance with standards for the purpose of securing compatibility. For example, Japanese Laid-Open Patent Publication No. 2003-331526 discloses a technique for recording management information and the like other than management information determined in a management region in accordance with standards, thereby recording/reproducing various extension files and the like onto/from an optical disc.

In the case where management information regarding a recording mode is temporarily recorded in a management region, however, a recording/reproducing apparatus reproduces information regarding the recording mode recorded in the management information, and determines whether or not data can be additionally written onto an unrecorded region on the basis of the reproduction result. Therefore, the data cannot be recorded with the use of quite different recording mode.

Accordingly, in the case where data is recorded with the use of the DAO mode or the INC mode that requires no preparation period for recording with respect to a DVD-RW, if there arises a necessity of overwriting later, the recorded data must be erased. Therefore, a time for erasing the data must be secured. That is, there is a problem that it takes much time to prepare for rerecording.

On the other hand, in the case where overwriting must be executed from the beginning, it is sufficient that data is recorded in a so-called ROW mode. However, since a finalizing process must be performed at first as described above, there is a problem that it takes much time to prepare for recording. That is, in the case where overwriting must be performed, a predetermined preparation period must be provided in any recording modes.

SUMMARY OF THE INVENTION

The present invention has been made for overcoming the aforementioned problems and aims to provide an optical disc recording/reproducing apparatus capable of recording data without provision of a predetermined preparation period for recording.

An optical disc recording/reproducing apparatus according to the present invention records/reproduces data onto/from a rewritable recording medium having a data region which records data information and a management region which records management information for managing the data region. The optical disc recording/reproducing apparatus includes a recording/reproducing part to record/reproduce the data information and the management information onto/from the recording medium, and a controller to control the recording/reproducing part. Herein, the recording/reproducing part records data with the use of one of a first write mode for sequentially recording data onto an unrecorded region from a predetermined position and a second write mode for recording data onto a recording region while overwriting the data, which are recording modes recorded in the management region of the recording medium, at the time of recording data onto the data region of the recording medium, the controller instructs the recording/reproducing part to record a fact that the first write mode is used onto the management region of the recording medium and, also, to record the data with the use of the first write mode, when it is determined that data to be recorded next cannot be recorded onto the unrecorded region in the data region of the recording medium with the use of the first write mode, the controller instructs the recording/reproducing part to record a fact that the second write mode is used onto the management region of the recording medium and, also, to record the data to be recorded next with the use of the second write mode, the first write mode is a sequential recording mode and the second write mode is a restricted over write mode, the recording medium is a DVD-RW, and when it is determined that data to be recorded next cannot be recorded onto the unrecorded region in the data region of the recording medium with the use of the first write mode, the controller further instructs the recording/reproducing part to record lead-out after the recording region of the recording medium.

An optical disc recording/reproducing apparatus according to the present invention records/reproduces data onto/from a rewritable recording medium having a data region which records data information and a management region which records management information for managing the data region. The optical disc recording/reproducing apparatus includes a recording/reproducing part to record/reproduce the data information and the management information onto/from the recording medium, and a controller to control the recording/reproducing part. Herein, the recording/reproducing part records data with the use of one of a first write mode for sequentially recording data onto an unrecorded region from a predetermined position and a second write mode for recording data onto a recording region while overwriting the data, which are recording modes recorded in the management region of the recording medium, at the time of recording data onto the data region of the recording medium, the controller instructs the recording/reproducing part to record a fact that the first write mode is used onto the management region of the recording medium and, also, to record the data with the use of the first write mode, and when it is determined that data to be recorded next cannot be recorded onto the unrecorded region in the data region of the recording medium with the use of the first write mode, the controller instructs the recording/reproducing part to record a fact that the second write mode is used onto the management region of the recording medium and, also, to record the data to be recorded next with the use of the second write mode.

Preferably, the first write mode is a sequential recording mode and the second write mode is a restricted over write mode.

Preferably, the recording medium is a DVD-RW.

Preferably, when it is determined that data to be recorded next cannot be recorded onto the unrecorded region in the data region of the recording medium with the use of the first write mode, the controller further instructs the recording/reproducing part to record lead-out after the recording region of the recording medium.

The optical disc recording/reproducing apparatus according to the present invention performs recording with the use of a first write mode for sequentially recording data onto an unrecorded region. In the case of arising a necessity of overwriting, the optical disc recording/reproducing apparatus performs recording with the use of a second write mode for recording data onto a recording region. More specifically, in the case of arising a necessity of overwriting, data is recorded onto the recording region with the use of the second write mode which does not require a so-called finalizing process. Therefore, overwriting can be performed without a preparation period which is necessary upon overwriting.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 illustrates RMA lead-in;

FIG. 4 illustrates field contents recorded in the RMA lead-in;

FIG. 5 illustrates types of format regarding a recording mode recorded in RMD;

FIGS. 6A to 6D illustrate formats recorded in the RMD;

DESCRIPTION OF THE PREFERRED EMBODIMENTS

Figure 1:
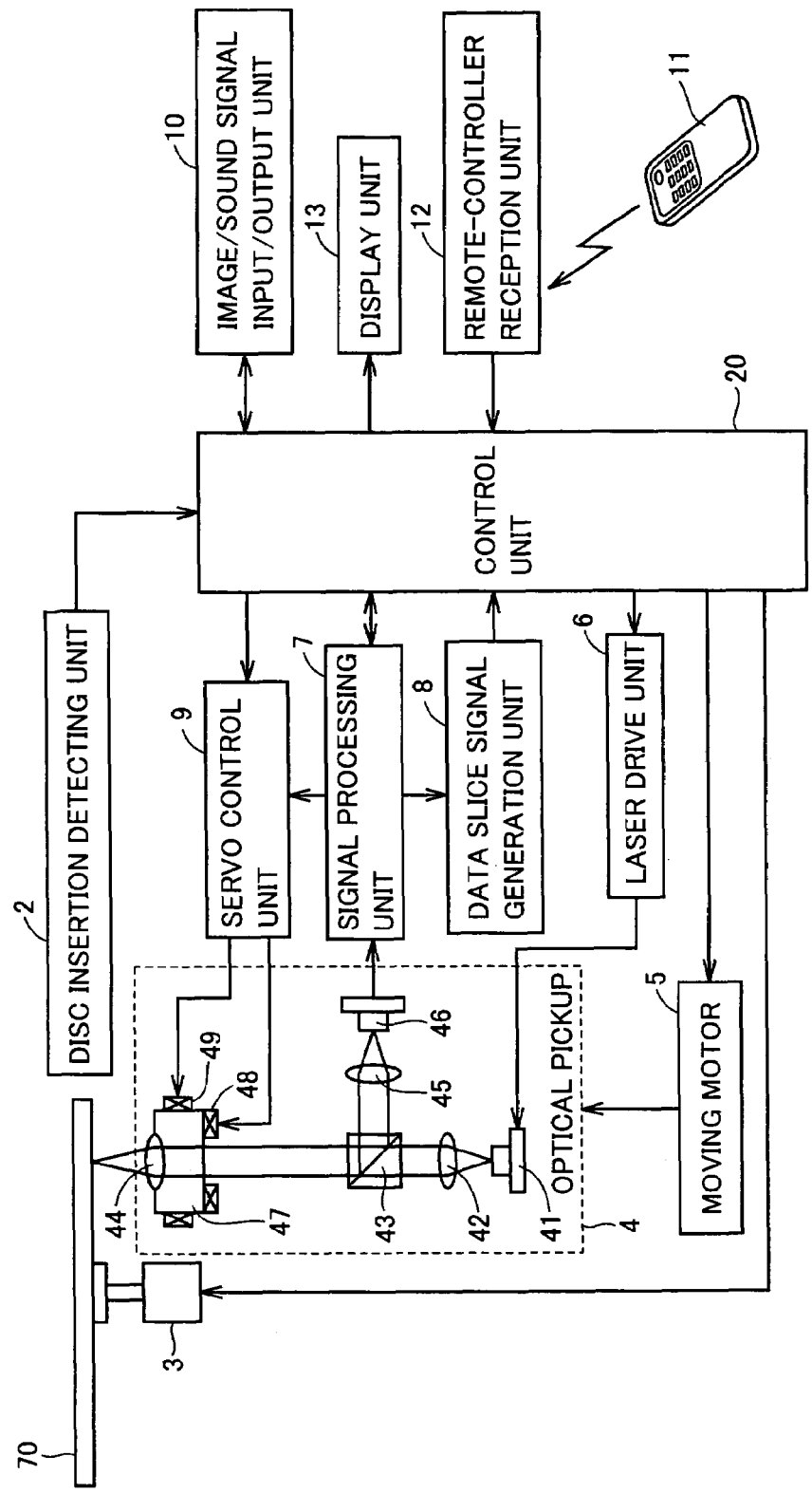
FIG. 1 is a schematic block diagram of an optical disc recording/reproducing apparatus according to an embodiment of the present invention.

Hereinafter, embodiments of the present invention will be described in detail with reference to the drawings. In the drawings, like reference characters refer to like or corresponding elements and description thereof will not be repeated.

Referring to FIG. 1, an optical disc recording/reproducing apparatus 1 according to an embodiment of the present invention performs recording and/or reproduction of information such as music, images and the like onto and/or from an optical disc 70, such as a CD or a DVD, having concentric or centrifugal information recording tracks formed thereon.

Optical disc recording/reproducing apparatus 1 includes a disc insertion detecting unit 2, a spindle motor 3, an optical pickup 4, a moving motor 5, a laser drive unit 6, a signal processing unit 7, a data slice signal generation unit 8 and a servo control unit (focusing control unit, tracking control unit) 9. Optical disc recording/reproducing apparatus 1 also includes an image/sound signal input/output unit 10, a remote controller 11, a remote-controller reception unit 12, a display unit 13 and a control unit 20 for controlling the aforementioned respective units.

Disc insertion detecting unit 2 detects optical disc 70 being inserted from a disc insertion unit (not shown) and inputs signals indicative thereof to control unit 20. The inserted optical disc 70 is mounted to spindle motor 3. Spindle motor 3 is driven to rotate in accordance with commands from control unit 20 and is controlled to rotate the mounted optical disc 70 at a predetermined speed.

Optical pickup 4 applies light for recording and/or reproduction of information onto and/or from optical disc 70 and, also, receives the reflected light from optical disc 70, converts it into electrical signals and outputs them. Optical pickup 4 is moved over optical disc 70 in the radial direction thereof by moving motor 5 constituted by a linear motor, on the basis of commands from control unit 20.

Optical pickup 4 focuses light emitted from a semiconductor laser 41 and applies the light to optical disc 70 through a collimating lens 42, a beam splitter 43 and an objective lens 44. Further, the reflected light from optical disc 70 is received at a photodetector 46 through objective lens 44, beam splitter 43 and a condenser lens 45.

The light emission of semiconductor laser 41 is controlled by laser drive unit 6 which operates in accordance with commands from control unit 20. Photodetector 46 is constituted by a split photodiode having a light-receiving surface divided into a plurality of regions for outputting electrical signals depending on the light intensities received at the respective light-receiving surface regions. Output signals from photodetector 46 are input to signal processing unit 7.

Objective lens 44 is held by a lens holder 47 which is provided with a focusing coil 48 and a tracking coil 49. Focusing coil 48 is used for moving objective lens 44 in the direction perpendicular to the disc surface of optical disc 70 through the magnetic effect of a magnet (not shown). Further, tracking coil 49 is used for moving objective lens 44 in the direction perpendicular to the recording tracks on optical disc 70 in parallel with the disc surface of optical disc 70.

Signal processing unit 7 generates RF signals (reflection intensities) on the basis of output signals from photodetector 46 and outputs them to data slice signal processing unit 8. The data slice signal generation unit 8 generates data slice signals by binarizing the RF signals and inputs them to control unit 20. Control unit 20 detects pits formed on optical disc 70 on the basis of the data slice signals.

Further, signal processing unit 7 generates focus error signals and track error signals on the basis of output signals from photodetector 46 and outputs them to servo control unit 9. Focus error signals are signals corresponding to the amount of deviation of the focus point of the light which is applied to optical disc 70 through objective lens 44 from the surface of optical disc 70, and track error signals are signals corresponding to the amount of deviation of the focus point from the recording tracks.

Servo control unit 9 performs servo control for controlling the electric currents supplied to focusing coil 48 and tracking coil 49 on the basis of these focus error signals and track error signals to move objective lens 44 such that the focus point is positioned on the disc surface of optical disc 70 and on the recording tracks.

Image/sound signal input/output unit 10 is connected to external apparatuses such as a display, a loudspeaker and a television receiver which are not shown. Through image/sound signal input/output unit 10, image signals or sound signals reproduced from optical disc 70 are output and image signals or sound signals from the external apparatus are input.

Remote controller 11 is used for manipulating various kinds of operations of optical disc recording/reproducing apparatus 1 and includes operation keys (not shown) for manipulating the various kinds of operations. In response to manipulations of the keys, remote controller 7 sends infrared ray signals which are signals corresponding to such key manipulation. Remote controller reception unit 12 receives the infrared ray signals sent from remote controller 11 and outputs the signals to control unit 20. Display unit 13 is provided on the front panel of the main body of optical disc recording/reproducing apparatus 1 and displays the content of operations performed on remote controller 11 and also displays the condition of operations of optical disc recording/reproducing apparatus 1.

Hereinafter, recording/reproduction of information onto and/or from optical disc 70 will be described. First, for reproduction of information from optical disc 70, light from semiconductor laser 41 is applied to optical disc 70 and the reflected light is received at photodetector 46 while optical disc 70 is rotated at a predetermined speed by spindle motor 3. Further, servo control unit 9 controls the electric current supplied to focusing coil 48 on the basis of focus error signals from signal processing unit 7 to move objective lens 44 for performing focus-on (focus drawing) such that the focus point of the light from semiconductor lens 41 is positioned on the surface of optical disc 70. Further, servo control unit 9 controls the electric current supplied to tracking coil 49 on the basis of tracking error signals from signal processing unit 7 to move objective lens 44 for performing track-on (track drawing) such that the focus point of the light from semiconductor lens 41 is positioned on a desired recording track.

After completing focus-on and track-on, servo control unit 9 performs focusing servo control and tracking servo control by controlling the electric currents supplied to focusing coil 48 and tracking coil 49 on the basis of focus error signals and tracking error signals to move objective lens 44 such that the focus-on state and the track-on state are maintained.

Then, in the servo state, RF signals output from signal processing unit 7 are input to data slice signal generation unit 8 and data slice signal generation unit 8 binarizes the RF signals into data slice signals and inputs them to control unit 20. Control unit 20 detects the presence or absence of pits formed on optical disc 70 on the basis of the data slice signals, reads information recorded on optical disc 70 and reproduces the read information into image signals or sound signals. The image signals or sound signals are output from image/sound signal input/output unit 10 to the external apparatus.

Further, recording of information onto optical disc 70 is performed by forming pits on optical disc 70 with light from semiconductor laser 41 in the focusing and tracking servo states. At this time, image signals or sound signals input from image/sound signal input/output unit 10 are coded by control unit 20 and semiconductor laser 41 is controlled to generate light in accordance with the coded data under the control by control unit 20. Thus, pits according to the coded data are formed on the recording tracks on optical disc 70, so that information of images or sounds is recorded thereon. Semiconductor laser 41 is caused to generate higher-output light than for reading of information in order to enable the formation of pits.

Optical disc recording/reproducing apparatus 1 having the aforementioned configuration performs reproduction of information from optical disc 70 and recording of information onto optical disc 70 under the control of control unit 20 when remote controller 11 is manipulated. Further, when optical disc 70 is inserted, optical disc recording/reproducing apparatus 1 performs an initial operation for reading information recorded at the innermost circumferential side of optical disc 70 under the control of control unit 20. Then, on the basis of the information read during the initial operation, optical disc recording/reproducing apparatus 1 determines the type of the inserted optical disc 70 and the content of recorded data thereon and then controls subsequent operations such as recording or reproduction of information.

Hereinafter, there will be described a recoding mode for recording data onto a management region of optical disc 70 according to the embodiment of the present invention. Herein, there will be described a DVD-RW as an example of the optical disc. It is assumed herein that control unit 20 controls information about the management region of optical disc 70, and the like.

Using FIG. 2, the management region of optical disc 70 will be described.

Figure 2:
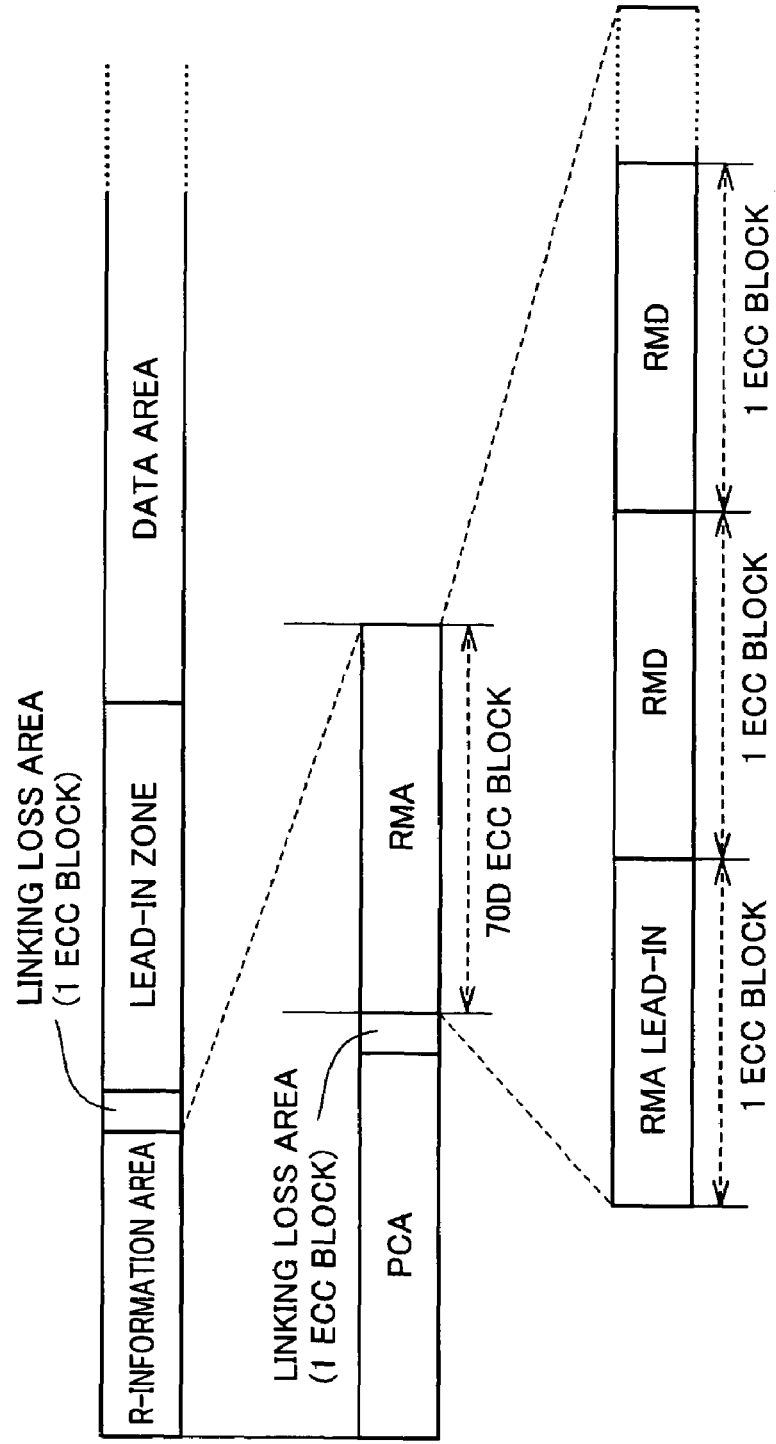
FIG. 2 illustrates a management region of an optical disc.

Referring to FIG. 2, a lead-in zone is provided, as the management region of optical disc 70, at an inner circumference of a data region which is a region for data storage, i.e., a data area. An R-information area is provided at a further inner circumference of the lead-in zone. Herein, a linking loss area of 1 ECC block (32 KB), for partitioning the regions, is provided between the R-information area and the lead-in zone.

Then, the R-information area is divided into a PCA (Power Calibration Area) which stores data information used for power calibration of a semiconductor laser at recording, and an RMA (Recording Management Area) which records management information such as various types of control information. Herein, the PCA and the RMA are partitioned by the aforementioned linking loss area for partitioning the regions.

The RMA is configured by RMA lead-in and RMD.

Using FIG. 3, the RMA lead-in will be described.

Referring to FIG. 3, the RMA lead-in is configured by a system reversed field and a unique identifier field.

Using FIG. 4, there will be described field contents recorded in the RMA lead-in.

The system reversed field is basically secured as an unused region. The unique identifier field records thereon information such as a drive manufacturer ID, a drive serial number, a drive model number and a disc ID.

Then, information regarding a recording mode at recording, and the like are stored in the RMD.

Using FIG. 5, there will be described types of format regarding a recording mode recorded in the RMD.

Referring to FIG. 5, in the case where a DAO mode and an INC mode are adopted as a recording mode, information called "format 1 RMD" is recorded in the RMD and, also, information called "format 2 RMD" is recorded in the RMD.

On the other hand, in the case where a ROW mode is adopted as a recording mode, information called "format 3 RMD" is recorded in the RMD and, also, the information called "format 2 RMD" is recorded in the RMD. These formats are standardized, and are created by processing such as calculation in control unit 20 and, then, recorded in the RMD.

FIG. 6A illustrates a classification of types of data recorded in the RMD. More specifically, a fixed value, a status, drive information, a numeric value, a defect, and a counter are recorded in the RMD.

FIG. 6B is a configuration diagram of the standardized format 1 RMD. As illustrated in this figure, various types of data which are standardized are recorded at fields 0 to 12.

FIG. 6C is a configuration diagram of the standardized format 2 RMD, and FIG. 6D is a configuration diagram of the standardized format 3 RMD.

Using a flow chart of FIG. 7, there will be described a recording mode at the time of recording data onto the optical disc according to the embodiment of the present invention.

Figure 7:
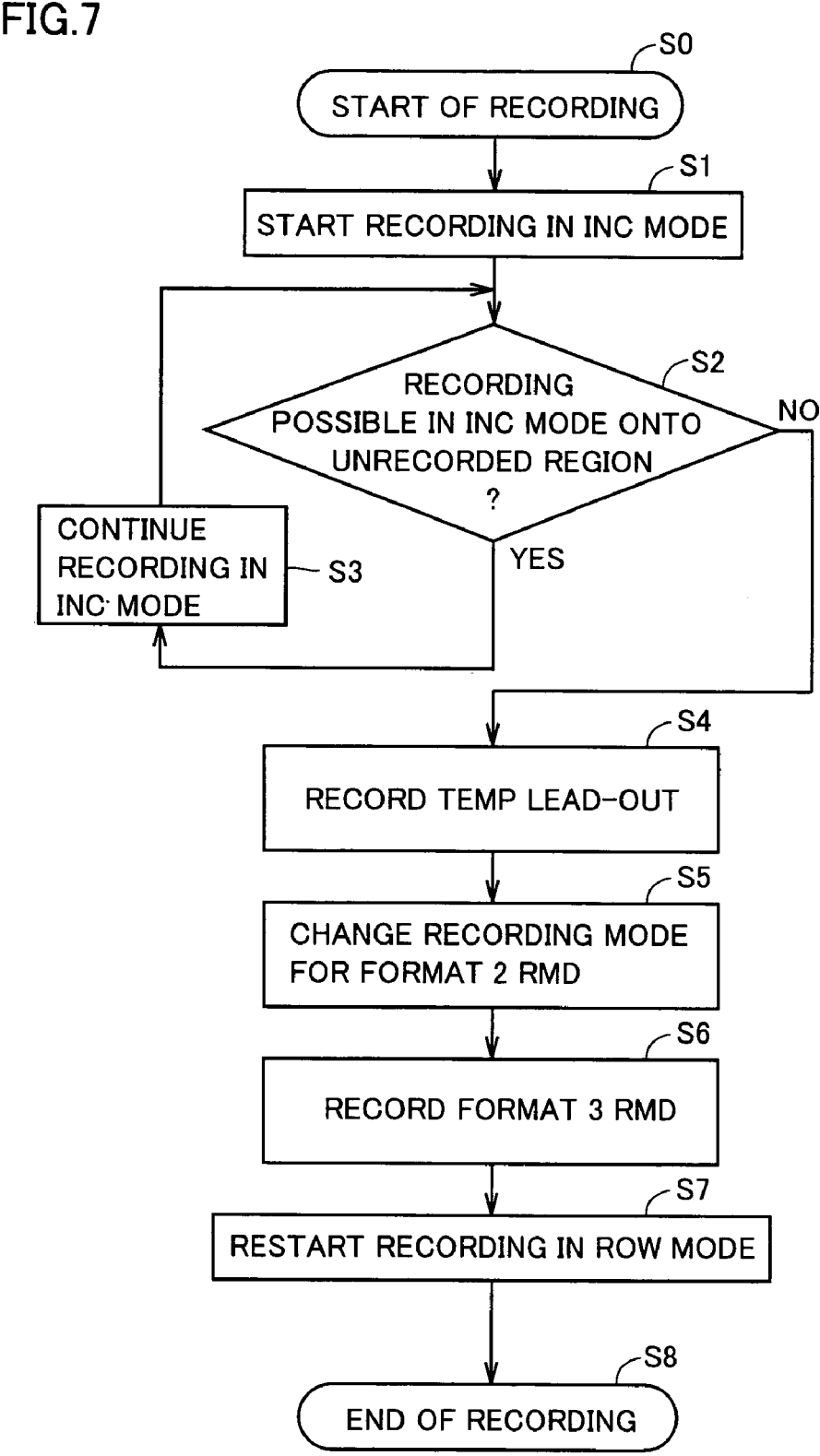
FIG. 7 is a flow chart for describing a recording mode at the time of recording data onto the optical disc according to the embodiment of the present invention.

Referring to FIG. 7, recording is started (step S0). At the time of start of initial data recording, the recording is started in the INC mode (step S1). Accordingly, information of the format 1 RMD and information of the format 2 RMD are recorded in the RMD of the management region.

Next, it is determined whether the recording is possible in the INC mode onto an unrecorded region (step S2). In the case where data is input and recorded next, if it is determined that the recording is possible in step S2, the process proceeds to step S3, in which the recording is continued in the INC mode (step S3). Then, the process returns to step 2 again.

On the other hand, in the case where data is input and recorded next, if a data record amount is large with respect to the unrecorded region, all data cannot be recorded. Accordingly, in such a case, it is determined that the recording onto the unrecorded region is impossible in the INC mode. If it is determined that the recording is impossible in step S2, the process proceeds to step S4. Then, temp lead-out is recorded in a last portion of the recording region. Herein, the reason why the temp lead-out is recorded is as follows: the temp lead-out is necessary for the ROW mode in accordance with the standards.

Then, data of a recording mode for the format 2 RMD is changed in the RMD in the management region (step S5). Specifically, the recording mode recorded in the format 2 RMD is changed from the INC mode to the ROW mode.

Control unit 20 newly creates format 3 RMD from various types of control information in which data has been recorded, and records the format 3 RMD onto the RMD in the management region (step S6).

Thus, the recording can be performed on optical disc 70 in the ROW mode, and the recording is restarted in the ROW mode (step S7). If the data recording is complete, the recording is finished (step S8).

Figure 8:
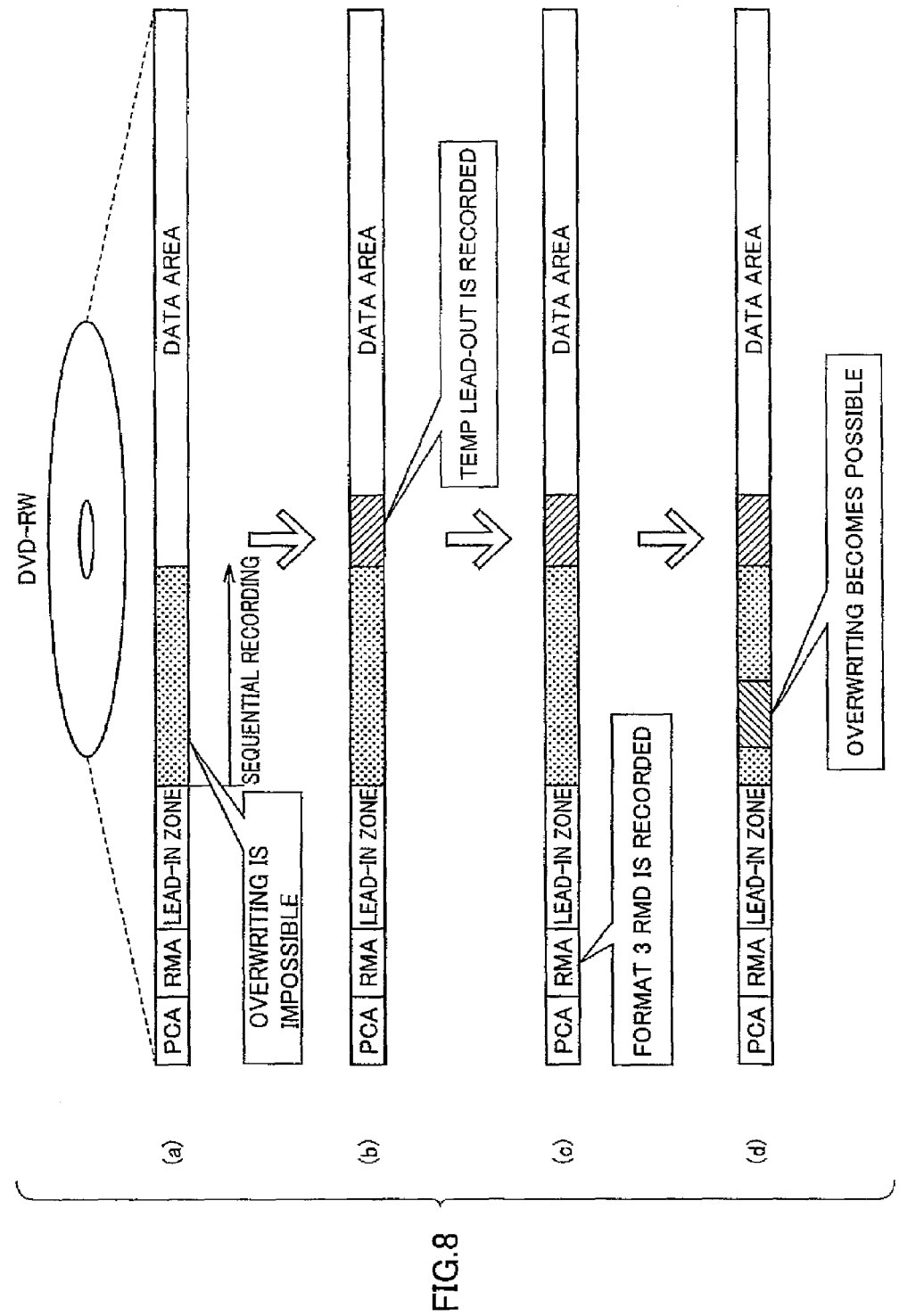
FIG. 8 schematically illustrates change of the recording mode according to FIG. 7.

Using FIG. 8, there will be schematically described change of a recording mode according to FIG. 7.

As illustrated in FIG. 8(a), in a DVD-RW, start of initial first recording is recorded in a sequential recording mode. In the sequential recording mode, overwriting is impossible. However, a finalizing process is unnecessary as described above; therefore, a preparation for recording is unnecessary. Then, if it is determined that recording is impossible on the unrecorded region in the INC mode, for example, temp lead-out is recorded in the last portion of the recording region as illustrated in FIG. 8(b). As illustrated in FIG. 8(c), the format 3 RMD is recorded in the RMA. Although not illustrated in the figure, the recording mode for the format 2 RMD is also changed to the ROW mode. Thus, overwriting becomes possible on the recording region in the ROW mode as illustrated in FIG. 8(d). That is, in the ROW mode, since any information is already recorded at the time of performing the overwriting on the recording region, the recording can be immediately performed without finalization. Accordingly, according to the recording modes of this embodiment, recording is performed without preparation for recording with the use of the INC mode upon first recording. If the recording cannot be performed on the unrecorded region in the INC mode, the recording mode is changed from the INC mode to the ROW mode. Thus, since the overwriting is performed on the recording region with the use of the ROW mode, a finalizing process in the ROW mode, i.e., a recording preparation period is unnecessary; therefore, the recording can be immediately performed. More specifically, with the optical disc recording/reproducing apparatus according to this embodiment, it is possible to record data without provision of a predetermined preparation period for recording.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical disc recording/reproducing apparatus for recording/reproducing data onto/from a rewritable recording medium having a data region which records data information and a management region which records management information for managing said data region, the optical disc recording/reproducing apparatus comprising:

a recording/reproducing part to record/reproduce said data information and said management information onto/from said recording medium; and a controller to control said recording/reproducing part, wherein said recording/reproducing part records data with the use of one of a first write mode for sequentially recording data onto an unrecorded region from a predetermined position and a second write mode for recording data onto a recording region while overwriting the data, which are recording modes recorded in said management region of said recording medium, at an initial time of recording data onto said data region of said recording medium, said controller instructs said recording/reproducing part to record a fact that said first write mode is used onto said management region of said recording medium and, also, to record the data with the use of said first write mode, when it is determined that data to be recorded next cannot be recorded onto said unrecorded region in said data region of said recording medium with the use of said first write mode, said controller instructs said recording/reproducing part to record a fact that said second write mode is used onto said management region of said recording medium and, also, to record said data to be recorded next with the use of said second write mode, said first write mode is a sequential recording mode and said second write mode is a restricted over write mode, said recording medium is Digital Versatile Disk ReWritable, and when it is determined that data to be recorded next cannot be recorded onto said unrecorded region in said data region of said recording medium with the use of said first write mode, said controller further instructs said recording/reproducing part to record lead-out after the recording region of said recording medium.

2. An optical disc recording/reproducing apparatus for recording/reproducing data onto/from a rewritable recording medium having a data region which records data information and a management region which records management information for managing said data region, the optical disc recording/reproducing apparatus comprising:

a recording/reproducing part to record/reproduce said data information and said management information onto/from said recording medium; and a controller to control said recording/reproducing part, wherein said recording/reproducing part records data with the use of one of a first write mode for sequentially recording data onto an unrecorded region from a predetermined position and a second write mode for recording data onto a recording region while overwriting the data, which are recording modes recorded in said management region of said recording medium, at an initial time of recording data onto said data region of said recording medium, said controller instructs said recording/reproducing part to record a fact that said first write mode is used onto said management region of said recording medium and, also, to record the data with the use of said first write mode, when it is determined that data to be recorded next cannot be recorded onto said unrecorded region in said data region of said recording medium with the use of said first write mode, said controller instructs said recording/reproducing part to record a fact that said second write mode is used onto said management region of said recording medium and, also, to record said data to be recorded next with the use of said second write mode, and wherein when it is determined that data to be recorded next cannot be recorded onto said unrecorded region in said data region of said recording medium with the use of said first write mode, said controller further instructs said recording/reproducing part to record lead-out after the recording region of said recording medium.

3. The optical disc recording/reproducing apparatus according to claim 2, wherein said first write mode is a sequential recording mode and said second write mode is a restricted over write mode.

4. The optical disc recording/reproducing apparatus according to claim 2, wherein said recording medium is a Digital Versatile Disk ReWritable.

* * * * *